United States Patent [19]

Huitink

[11] 3,921,785

[45] Nov. 25, 1975

[54] CONVEYOR MEANS FOR CROP GATHERING EQUIPMENT

[75] Inventor: Gary W. Huitink, North Little Rock, Ark.

[73] Assignee: Iowa State University Research Foundation, Inc., Ames, Iowa

[22] Filed: Oct. 9, 1973

[21] Appl. No.: 404,355

Related U.S. Application Data

[63] Continuation of Ser. No. 209,262, Dec. 17, 1971, abandoned.

[52] U.S. Cl. .................................... 198/8; 56/14.3
[51] Int. Cl.² ........................................ B65G 65/00
[58] Field of Search ................ 198/8; 56/14.3, 14.4

[56] References Cited
UNITED STATES PATENTS

| | | | |
|---|---|---|---|
| 1,671,950 | 5/1928 | Necheff | 198/8 |
| 2,732,056 | 1/1956 | Pearson | 198/8 |
| 3,159,265 | 12/1964 | Kovacs | 198/8 |
| 3,352,093 | 11/1967 | Procter | 56/14.3 X |

FOREIGN PATENTS OR APPLICATIONS

| | | | |
|---|---|---|---|
| 317,352 | 8/1929 | United Kingdom | 56/14.3 |
| 6,402,194 | 9/1965 | Netherlands | 56/14.4 |

Primary Examiner—Evon C. Blunk
Assistant Examiner—Jeffrey V. Nase
Attorney, Agent, or Firm—Zarley, McKee, Thomte & Voorhees

[57] ABSTRACT

A conveyor means for crop gathering equipment is disclosed herein and generally comprises a combine header including an elongated platform having an elevated conveyor means extending upwardly and rearwardly therefrom. A first crop gathering mechanism is movably mounted on the platform between the elevating conveyor means and one of the ends of the platform means. A second crop gathering mechanism is also movably mounted on the platform between the elevating conveyor and the other end of the platform. Each of the crop gathering mechanisms comprise first and second spaced apart sprocket wheels having a chain means extending therearound and therebetween. A plurality of elongated paddle arms are secured at one end thereof to the chain in a spaced apart relationship so that the paddle arms will move along the bottom wall of the platform towards the elevating conveyor means as the chain is driven by its suitable power means. A cam guide means is provided between the elevating conveyor means and the crop gathering mechanism to guide the paddle arms as they move from their conveying position to their return position so that the crop material will be pitched towards the elevating conveyor means. The crop material is pitched tangentially with less altitude than the paddle arms as they rise out of crop material to their return position. Proper chain velocity powering the paddle arms and proper paddle arm construction are provided to change crop material linear direction to round a curve rearwardly for discharge.

1 Claim, 3 Drawing Figures

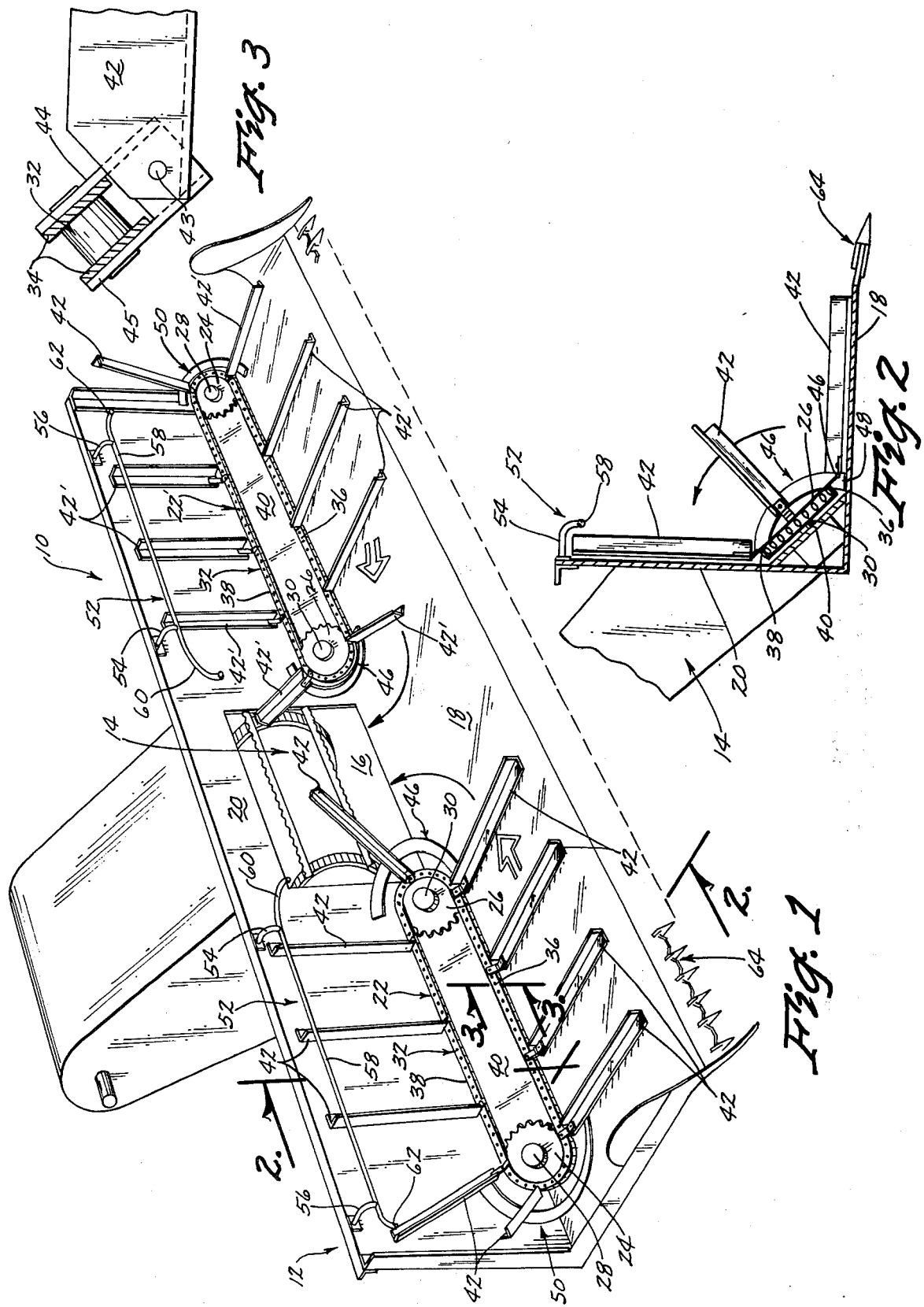

CONVEYOR MEANS FOR CROP GATHERING EQUIPMENT

This application is a continuation of co-pending application Ser. No. 209,262, filed Dec. 17, 1971 and now abandoned.

Conventional combine headers generally include an elongated auger means rotatably mounted on the platform which is adapted to convey the crop material towards the rearwardly extending elevating conveyor. The auger generally functions satisfactorily but the flighting of the auger does damage certain crops as the crop material is being conveyed along the length of the platform. Additionally, the crop material tends to clog or plug ahead of the intake area of the elevating conveyor since the crop material must be moved rearwardly from the auger into engagement with the intake end of the elevating conveyor.

Therefore, it is a principal object of this invention to provide a conveyor means for crop gathering equipment.

A further object of this invention is to provide a conveyor means for a combine header.

A further object of this invention is to provide a conveyor means for a combine header including means to pitch the conveyed material rearwardly into the elevating conveyor.

A further object of this invention is to provide a conveyor means for a combine header including means to pitch the crop material rearwardly and upwardly into engagement with the intake end of the elevating conveyor.

A further object of this invention is to provide a conveyor means for crop gathering equipment which does not damage the crop material.

A further object of this invention is to provide a conveyor means for crop gathering equipment which substantially reduces the tendency of the material to clog or plug ahead of the intake end of the elevating conveyor.

A further object of this invention is to provide a conveyor means for crop gathering equipment which is compact and requires a minimum amount of space.

A further object of this invention is to provide a conveyor means for crop gathering equipment including paddle arms which wipe the crop material towards the center of platform.

A further object of this invention is to provide a conveyor means for crop gathering equipment which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specfically pointed out in the claims, and illustrated in the accompanying drawings, in which:

FIG. 1 is a front perspective view of a typical combine header having the conveying means of this invention mounted thereon:

FIG. 2 is a sectional view taken along lines 2—2 of FIG. 1; and

FIG. 3 is a plan view illustrating the means for connecting the paddle arms to the chain.

The numeral 10 refers generally to a typical combine header including a platform 12 and an elevating conveyor 14 extending upwardly and rearwardly from the center thereof. Elevating conveyor 14 includes an intake end 16 and is adapted to convey the crop material upwardly and rearwardly therefrom to the combine cylinder assembly.

Platform 12 includes a bottom wall 18 and a back wall 20 extending upwardly from the rearward end thereof.

The numerals 22 and 22' generally refer to crop gathering mechanisms which are provided on the platform at opposite sides of the elevating conveyor 14 as best seen in FIG. 1. Inasmuch as the mechanisms 22 and 22' are substantially identical, only crop gathering mechanism 22 will be described in detail with "'" indicating identical structure on mechanism 22'. A pair of spaced apart socket wheels 24 and 26 are mounted on shafts 28 and 30 respectively in the spaced apart relationship illustrated in FIG. 1. Each of the shafts 28 and 30 are provided with suitable bearing means for supporting the same and one of the shafts will be connected to a source of power through conventional gears, chains or pulleys. A chain 32 extends around and between the sprocket wheels 24 and 26 and is comprised of a plurality of chain links 34. For purposes of description, the chain will be described as defining a conveying portion 36 and a return portion 38. A shield 40 extends between the sprocket wheels 24 and 26 to prevent crop material from becoming entangled therebehind.

A plurality of angle members or paddle arms 42 are secured to the chain 32 in a spaced apart relationship for movement therewith. As seen in FIG. 3, the paddle arms 42 are secured by pin or rivet 43 to the spaced apart plates 44 and 45 which are secured to chain 32.

A cam guide 46 is secured to the platform inwardly of the sprocket wheel 26 as illustrated in FIG. 1. The cam guide 46 is truncated conical in configuration and extends upwardly and rearwardly from its lower end 48 towards the elevating conveyor 14. As seen in FIG. 1, the upper portion of the cam guide 46 extends upwardly and away from the elevating conveyor 14. A cam guide 50 is also provided on the platform adjacent the sprocket wheel 24 and has a configuration best illustrated in FIG. 1.

The numeral 52 refers generally to an optional guide rail means comprised of hangers 54 and 56 and guide rail 58. The hangers 54 and 56 are secured to back wall 20 adjacent the upper end thereof and extend forwardly therefrom so that the guide rail 58 is disposed forwardly of the forward surface of back wall 20. Guide rail 58 is provided with arcuate end portions 60 and 62 as shown in FIG. 1. As previously stated, the guide rail means 52 is optional and would ordinarily be used when the paddle arms 42 need additional support.

In operation, the combine would be moved through the standing crop with the sickle bar assembly 64 cutting the crop. Preferably, the combine would also have a reel means or the like to engage the standing crop as it is being severed so that the severed crop material will be deposited on the platform.

The crop material is conveyed towards the intake end 16 of the elevating conveyor 14 by the paddle arms 42 and 42'. The paddle arms wipe upon the bottom wall 18 of platform 12 to insure that the crop material will be efficiently conveyed towards the center of the platform without damaging the crop material. The sprocket wheels 24 and 26 are disposed at an acute angle with respect to the bottom wall 18 and the back wall 20 (in this example 45°) so that the paddle arms will be parallel to bottom wall 18 during their conveying travel and so that the paddle arms will be parallel to back wall 20 during their return travel.

The paddle arms 42 engage the lower end of the cam guide 46 as the paddle arm 42 nears the intake end 16 of elevating conveyor 14. The cam guide 46 causes the paddle arm 42 to not only be efficiently guided to its return position but also causes the material conveyed thereby to be pitched rearwardly towards the intake end 16 as the paddle arm 42 is guided to its return position. Thus, the cam guide 46 not only causes the paddle arms 42 to change their direction of movement but also causes the crop material to be conveyed or pitched rearwardly to the intake end 16 of the elevating conveyor 14 so that the material will not tend to clog at the intake end 16. The cam guide 50 serves to guide the paddle arms 42 from their return position downwardly into their conveying position. The cam guides prevent the paddle arms from "dropping" since all chains have a certain amount of flexibility therein.

The chains are moved at a predetermined velocity and the cam guides and paddle arms are constructed so that the crop material is pitched tangentially with less altitude than the paddle arms as they rise out of the crop material to their return position. Thus, the paddle arms pitch the crop material rearwardly as the paddle arms rise to their return position. The fixed angular paddle orientation creates a much better pitching action by the arms as they act on the crop material.

Thus it can be seen that a unique conveyor means has been provided for crop gathering equipment which not only efficiently conveys the material along the platform but which also pitches the material towards the intake end of the elevating conveyor. Clogging or plugging at the intake of the elevating conveyor is substantially reduced and the material is conveyed thereto with a minimum amount of damage being suffered by the crop material. While the conveyor means has been described as being especially well adapted for the combine header illustrated in FIG. 1, it should be noted that the conveyor apparatus will work equally as well if the elevating conveyor 14 is provided at one end of the platform. In such an arrangement, only a single conveyor means would be necessary. Additionally, the conveyor means of this invention could be used on a swather or the like which does not have an elevating conveyor thereon.

Thus it can be seen that the conveying means of this invention accomplishes at least all of its stated objectives.

I claim:
1. A crop gathering mechanism comprising,
an elongated platform means having a bottom wall and a back wall means extending upwardly therefrom, said platform means having first and second ends,
first and second spaced apart wheels rotatably mounted on said bottom wall at an angle thereto, said wheels being positioned forwardly of said back wall,
a flexible member extending around and between said wheels,
power means for rotating one of said wheels to drive said flexible member,
a plurality of paddle arms secured to said flexible member in a spaced apart relationship adapted to move along said bottom wall along the length of said platform means to convey crop along said bottom wall; said paddle arms being angularly disposed to said flexible member,
means rigidly fixing the paddle arms to the flexible member for maintaining a fixed position of the paddle arms relative to the flexible member to enhance the pitching action of said paddle arms on material conveyed thereby,
said platform means being mounted on a combine header, said header having a crop elevating conveyor means extending upwardly and rearwardly from said back wall, said second wheel being positioned adjacent said elevating conveyor means,
a first cam guide means on said platform means between said second wheel and said elevating conveyor means adapted to engage the paddle arms to guide said paddle arms upwardly and rearwardly from said bottom wall to convey the crop towards said elevating conveyor means,
a guide rail means positioned on said back wall between said wheels said guide rail means being spaced forwardly of said back wall and being adapted to receive the paddle arms between said guide rail means and said back wall during the return portion of the travel of said flexible member,
said first cam guide means has a lower end positioned closely adjacent said bottom wall and said second wheel, said cam guide means being truncated conical and extending upwardly and rearwardly from its lower end and thence upwardly and laterally towards said first wheel,
each of said paddle arms comprising an elongated angle member.

* * * * *